(12) United States Patent
Appel et al.

(10) Patent No.: US 8,206,825 B2
(45) Date of Patent: Jun. 26, 2012

(54) PREPARATION OF WIRES AND CABLES

(75) Inventors: Marvin R. Appel, Loveland, OH (US);
Mick C. Hundley, Loveland, OH (US);
Jeffrey S. Borke, Middletown, OH (US);
Steven W. Horwatt, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 705 days.

(21) Appl. No.: 12/006,532

(22) Filed: Jan. 3, 2008

(65) Prior Publication Data

US 2009/0176093 A1 Jul. 9, 2009

(51) Int. Cl.
*B32B 15/085* (2006.01)
*H01B 3/30* (2006.01)

(52) U.S. Cl. ....... 428/379; 428/375; 428/383; 174/23 C; 174/113 R; 174/110 PM; 385/123; 385/144; 385/145

(58) Field of Classification Search .......................... None
See application file for complete search history.

(56) References Cited

U.S. PATENT DOCUMENTS

| | | | | |
|---|---|---|---|---|
| 4,260,661 | A * | 4/1981 | Walters et al. | 428/389 |
| 4,844,578 | A | 7/1989 | Pierini et al. | |
| 5,672,640 | A * | 9/1997 | Brauer | 523/173 |
| 5,911,023 | A | 6/1999 | Risch et al. | |
| 6,228,495 | B1 * | 5/2001 | Lupia et al. | 428/379 |
| 6,424,771 | B1 | 7/2002 | Sheu | |
| 6,658,185 | B2 * | 12/2003 | Bosisio et al. | 385/109 |
| 6,882,784 | B2 | 4/2005 | Mumm et al. | |
| 7,223,432 | B2 | 5/2007 | Cholli et al. | |
| 7,238,765 | B2 | 7/2007 | Lee et al. | |
| 7,705,075 | B2 * | 4/2010 | Kumar et al. | 524/222 |
| 2005/0281517 | A1 * | 12/2005 | Wessels et al. | 385/109 |
| 2010/0084607 | A1 * | 4/2010 | Cholli et al. | 252/188.28 |

FOREIGN PATENT DOCUMENTS

| | | |
|---|---|---|
| EP | 0 287 244 | 10/1988 |
| EP | 0 957 383 | 11/1999 |
| WO | WO 03087260 * | 10/2003 |
| WO | WO 2006/014605 | 2/2006 |
| WO | WO 2006014605 A2 * | 2/2006 |
| WO | WO 2007050991 A1 * | 5/2007 |

OTHER PUBLICATIONS

Lilli Manolis Sherman, "*Additives for Polyolefins: Newest Advances Add Ruggedness, Good Looks & Easier Processing*," Plastics Technology (Online), Jul. 2005, XP002518819, Gardner Publications, Inc., US Retrieved from the Internet: URL:http://www.ptonline.com/articles/20050_7fal.html> [retrieved on Mar. 11, 2009] the whole document.

Anonymus: "Polnox: A New Class of High Performance Industrial Antioxidants: Technology" [Online], Jul. 22, 2007, XP002518820. Retrieved from the Internet: URL:http://web.archive.org/web/20070722214458/http://www.polnox.com/technology.htm> [retrieved on Mar. 11, 2009] the whole document.

* cited by examiner

*Primary Examiner* — Jill Gray

(57) ABSTRACT

A coated or jacketed wire or cable, and components thereof are disclosed. The coating, jacket, and components, which comprise a polyolefin and a phenolic polymeric antioxidant, exhibit outstanding oxidative thermal stability (as indicated by the increase in the oxidative inductive time (OIT)), when compared to polyolefins containing traditional non-polymeric antioxidants. A greater improvement in the thermal oxidative stability is observed after the polyolefin mixtures have been aged in water-blocking filler(s).

19 Claims, No Drawings

PREPARATION OF WIRES AND CABLES

FIELD OF INVENTION

This invention relates to coated wires and cables, and components. The coating, buffer tubes and the components, e.g. slotted cores, are prepared from a mixture comprising a polyolefin and a phenolic polymeric antioxidant.

BACKGROUND OF THE INVENTION

Polyolefin resins are used to prepare the insulation for wires and cables as well as components such as buffer tubes for optical fibers. When the wires and cables are used for telecommunications, the insulation must comply with requirements for thermal oxidative stability (e.g. Telecordia Specification GR-421). Thermal oxidative stability can be determined by measuring the oxidative induction time (OIT) of the resin with differential scanning calorimetry (DSC). DSC is used to measure the amount of time the polymer or resin can be maintained at an elevated temperature, e.g. 200° C., before significant signs of oxidative degradation are observed. A second test that is set forth in GR-421 is to measure the OIT of the insulation, once the insulation has been "aged" in water blocking filler for an extended period of time.

One approach of improving the oxidative stability of a resin is to add an antioxidant, such as IRGANOX® 1076 or 1010. A problem can occur, however, when the amount of antioxidant exceeds its solubility in the polyolefin resin. This problem of solubility is even more pronounced for "aged" resins. Because "aged" resins require higher concentrations of the antioxidant to meet the requirements of GR-421. Moreover, high concentrations of an antioxidant can also impair the dielectric properties of the polymer. Electrically active species in the antioxidant, e.g. functional groups, can lead to losses in the dielectric strength of the insulation. Furthermore, when high enough electric fields are applied across insulation, burning or vaporization of the insulation can occur. High concentrations of antioxidant can also lead to attenuation.

Another problem is that water-blocking agents extract the antioxidant from the polyolefin resin. When wires and cables are bundled together in a conduit or a tubular housing, a water-blocking agent (e.g. grease) is often introduced into the housing. Water-blocking agents are used to reduce or eliminate water migration paths into the housing. When a significant amount of antioxidant is extracted, surface deterioration can result in attenuation, cross-talk, or premature catastrophic failure, see e.g., U.S. Pat. No. 7,238,765.

Since optical fibers are relatively fragile they require mechanical support or protection, e.g. buffer tubes, reinforcing elements, during the handling and installation of the optical fiber cables. Extraction of the antioxidant by water-blocking agents from the buffer tubes, slotted cores, spacers, reinforcing elements etc. can also affect the reliability of optical fiber cables. The extraction of the antioxidant can lead to the deterioration of the mechanical properties of the resin, e.g. modulus of elasticity, elongation at break etc. As the polyolefin resin becomes more brittle, extrinsic attenuation can result from micro-bending, e.g. tensile force, of the optical fibers. Attenuation or signal loss can occur when light is refracted outside of the optical path. The degradation of the polymer material can also lead to the phenomena of tracking, in which paths or areas of erosion in the resin extend until the resin is ruptured.

It would be useful if the polyolefin resin used to prepare coatings for wire and cable and components could provide sufficient thermal oxidative stability at lower antioxidant concentrations. Moreover, it would be useful if the antioxidant in the resin is less susceptible to being extracted into the water-blocking agent, especially at elevated temperatures.

SUMMARY OF THE INVENTION

The present invention is directed to coated wires and cables including optical fiber cables and components. The coating and the components are prepared with a mixture comprising from about 45 wt % to about 99.9 wt % of a polyolefin, from about 0.005 wt % to about 5 wt % of a phenolic polymeric antioxidant, optionally up to about 60 wt % of an inorganic or organic filler, and optionally up to about 60 wt % of an additive. Surprisingly, we found that the oxidative inductive time (OIT) of an aged polyolefin containing a phenolic polymeric antioxidant is about 700% higher than the OIT of the aged polyolefin containing an equivalent amount of a traditional antioxidant.

DETAILED DESCRIPTION OF INVENTION

The wire or cable of the invention comprises a coating. The coating comprises a polyolefin. Suitable amounts of polyolefin are within the range of about 45 wt % to about 99.99 wt %, more preferably from about 60 wt % to about 95 wt %, and most preferably from about 70 wt % to about 90 wt % of the coating.

Suitable polyolefins include polyethylene, polypropylene, the like, and mixtures thereof. Suitable polyethylene includes high-density polyethylene (HDPE), low-density polyethylene (LDPE), medium-density polyethylene (MDPE), and linear low-density polyethylene (LLDPE), the like, and mixtures thereof. Suitable polypropylene includes propylene homopolymers, impact polypropylenes, propylene random copolymers with ethylene, α-olefins, the like, and mixtures thereof.

Suitable polyolefin preferably has a density within the range of about 0.89 $g/cm^3$ to about 0.97 $g/cm^3$, more preferably from about 0.90 $g/cm^3$ to about 0.97 $g/cm^3$, and most preferably from about 0.90 $g/cm^3$ to about 0.96 $g/cm^3$.

Suitable polyethylene preferably has a melt index ($MI_2$) within the range of about 0.01 g/10 min. to about 10 g/10 min., more preferably from about 0.1 g/10 min. to about 7 g/10 min., and most preferably from about 0.5 g/10 min. to about 6 g/10 min. Suitable polypropylene preferably has a melt flow rate (MF, at 230° C. and 2.16 Kg pressure) within the range of about 0.1 g/10 min. to about 50 g/10 min., more preferably from about 1 g/10 min. to about 35 g/10 min., and most preferably from about 4 g/10 min. to about 20 g/10 min.

The coating comprises a phenolic polymeric antioxidant. Suitable phenolic polymeric antioxidants mean any polymeric antioxidants which contain phenolic functional groups. The phenolic functional groups can be located either at the polymer chain ends or inside the polymer chains. Suitable amounts of antioxidant are within the range of about 0.005 wt % to about 5 wt %, preferably from about 0.01 wt % to about 1 wt %, and more preferably from about 0.05 wt % to about 0.1 wt %.

Preferably the phenolic polymeric antioxidant comprises a recurring unit selected from the group consisting of the general structure (I), structure (II), the like, and mixtures thereof

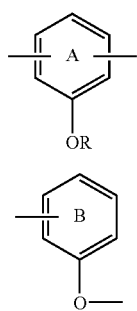

wherein R is selected from the group consisting of hydrogen, alkyl, acyl, and aryl; ring A and ring B are each independently substituted with at least one tert-butyl group or n-alkoxycarbonyl group; and ring A and ring B are each independently substituted with at least one substituent selected from the group consisting of hydroxyl, amino, thiol, alkyl, aryl and alkoxycarbonyl groups.

Preferably, the polymeric antioxidant has a weight average molecular weight within the range of about 500 to about 2,000,000, more preferably from about 1,000 to about 100,000, and most preferably from about 2,000 to about 10,000.

Methods for making the phenolic polymeric antioxidants are known. For example, U.S. Pat. No. 7,223,432, the teachings of which are incorporated by reference, discloses the synthesis of phenolic polymeric antioxidants by enzyme or an enzyme mimetic capable of polymerizing a substituted benzene compound in the presence of hydrogen peroxide. The enzyme or enzyme mimetic typically has a heme or related group at the active site. Suitable enzymes are able to catalyze the formation of a carbon-carbon bond and/or oxygen-carbon bond between the two aryl groups (phenyl or phenol).

The coating optionally comprises additives and fillers. Suitable additives include foaming agents, cross-linking agents, nucleation agents, flame retardants, light stabilizers, processing aids, heat stabilizers, antistatic agents, lubricants, optical brighteners, pigments, other antioxidants, dispersants, the like, and mixtures thereof. The additives can be used in an amount up to 60 wt % of the coating. Preferably, the additives are used in an amount within the range of about 0.05 wt % to about 10 wt % of the coating. More preferably, the additives are used in an amount within the range of about 0.05 wt % to about 5 wt % of the coating. Most preferably, the additives are used in an amount within the range of about 0.1 wt % to about 5 wt % of the coating.

Examples of suitable foaming agents include azodicarbonamide, p-toluene sulfonyl semicarbazide, p,p'-oxybis(benzenesulfonyl hydrazide), p-toluene sulfonyl hydrazide, azobisformamide, sodium carbonate, citric acid, the like, and mixtures thereof.

Nucleating agents are typically high melting compounds that do not melt at the processing temperature of the polymer and remain as discrete particles embedded in polymer melt. Suitable nucleating agents include organic and inorganic compounds. Preferable nucleating agents include metal salts of organic acids, e.g. salts of sulfonic and phosphonic acids, metal salts of mono-, di- and poly-carboxylic aliphatic, substituted and unsubstituted aromatic acids, carboxylic acids, the like, and mixtures thereof.

Suitable flame retardant agents include hydrated inorganic fillers such as hydrated aluminum oxides, hydrated magnesia, hydrated calcium silicate, hydrated zinc borate, hydrated calcium borate, inorganic phosphorus compounds such as red phosphorus, ammonium polyphosphate, organic phosphate compounds such as triphenyl phosphate, tricresyl phosphate, bisphenol A-bisdiphenyl phosphate, resorcinol-bisdiphenyl phosphate, nitrogen-containing organic compounds and derivatives such as melamine, guanamine, guanidine, the like, and mixtures thereof.

Suitable crosslinking agents include any crosslinking agents known in the art. Examples of suitable crosslinking agents include peroxides, silane crosslinking agents, methacrylate-based agents, cyanurate-based agents such as triallyl isocyanurate (TAIC), trimethallylisocyanurate (TMAIC), triallylcyanurate (TAC), the like, and mixtures thereof.

Examples of suitable fillers include inorganic or organic materials, including carbon black, talc, mica, clay, kaolin, silica, diatomaceous earth, fly ash, calcium carbonate, magnesium carbonate, barium carbonate, magnesium sulfate, barium sulfate, calcium sulfate, calcium oxide, magnesium oxide, titanium dioxide, aluminum oxide, aluminum hydroxide, glass powder, wood powder, or other cellulose-type powders, zeolites, cement dust, TEFLON® powders, KEVLAR® powders, wood powder or other cellulose-type powders, the like and mixtures thereof. The inorganic filler can be treated to repel water or reduce agglomeration of the filler in the polyolefin resin. Surface treatments can also be used to improve the bond between the filler and the polyolefin. The fillers can be used in an amount up to about 60 wt % of the coating. Preferably, the fillers are used in an amount within the range of about 1 wt % to about 60 wt % of the coating. More preferably, the fillers are used in an amount within the range of about 5 wt % to about 50 wt % of the coating. Most preferably, the fillers are used in an amount within the range of about 5 wt % to about 25 wt % of the coating.

The coating optionally comprises water-blocking agents. Suitable water-blocking agents include grease, petroleum hydrocarbons reinforced with amorphous polymers, elastomers, the like, and mixtures thereof. Examples of water-blocking agents include Witco Gel II, a high melting point petroleum reinforced with amorphous polymers and elastomers, and Witco Flexgel III, a mixture of petroleum hydrocarbons and polyethylene/polybutene. Water-blocking agents can be added under high pressure to fill the voids between groups of wires or cables that are bundled together in a conduit. The coatings of the wires and cables or the components are in contact with the water-blocking agent. The water-blocking agents can be used up to 50 wt % of the coating. Preferably, the water-blocking agents are used in an amount within the range about 1 wt % to about 50 wt % of the coating. More preferably, the water-blocking agents are used in an amount within the range of about 1 wt % to about 25 wt % of the coating. Most preferably, the water-blocking agents are used in an amount within the range of about 1 wt % to about 10 wt % of the coating.

Suitable coatings include one or more layers. Coating layers can be either nonfoam (skin) layers or foam layers. A two-layer coating includes a "nonfoam/foam" coating wherein the foam is disposed between the nonfoam and the conductor or optical fiber. At least a portion of the foam covers the conductor or optical fiber. A three-layer coating includes a "nonfoam/foam/nonfoam" wherein at least a portion of the conductor or optical fiber is in contact with an inner skin layer. Multilayer coatings, e.g. greater than three layers, can also be prepared with combinations of skin and foam layers. Dual- or multilayer coatings can be co-extruded wherein a foaming agent is used to prepare the foam layer.

Suitable electrical conductors include metals and alloys. The electrical conductors and optical fiber can be coated or insulated with the polyolefin and polymeric antioxidant of this invention. Telephone singles, for example, are generally produced with 28, 26, 24, 22, or 19 AWG (American Wire Gauge) copper wire having a diameter of about 0.320 mm to about 0.912 mm. The singles are commonly twisted into pairs and 25 or more pairs are bundled in a metallic or plastic sheath to produce the telecommunication cable. The exterior jacket provides mechanical protection for the individual conductors within.

Suitable cables include coaxial cables, monocables, quad-cables, heptacables, slickline cables, multiline cables, and the like. In coaxial cables, one or more sheaths, shieldings or foams can surround the conductor and insulation.

Optical fibers are cylindrical dielectric waveguides that transmits light by the process of internal reflection. Suitable fibers include individual fibers, optical fiber ribbons or a stack of optical fiber ribbons, the like and mixtures thereof. Suitable optical fibers include single-mode fibers, multi-mode fibers, dispersion-shifted fibers, non-zero dispersion fibers, the like and mixtures thereof.

Optical fibers cable can be classified into three categories: loose tubes, monotubes, and slotted cores. In loose tube optical fiber cables, the optical fiber(s) lay in a plurality of optical fiber buffer tubes stranded around a central polymeric element that provides mechanical support. Where the number of fiber cables is less than the maximum number that can be placed about the central reinforcing element, one or more flexible polyolefin filler rods can be wrapped around the central element. In a slotted core optical fiber cable, the optical fiber(s) reside in channels or grooves that form a helical path on the surface of a rod-shaped core. The channels or grooves are commonly filled with a water-blocking compound(s). Slotted core cables typically include a buffer tube that covers the slotted core. In a monotube cable the optical fibers reside in a central tube which is generally filled with at least one water-blocking agent. In all three structures, the buffer tube or core provides the primary structure to protect the thin optical fibers contained within. Multiple optical fiber cables can be disposed around a central reinforcing element that provides mechanical support to the optical fibers cables. Fiber optical cables (loose tube, monotubes and slotted core) are jacketed or housed in an additional protective layer, e.g. polyolefin, with the addition of a water-blocking agent. See e.g. U.S. Pat. Nos. 5,911,023 and 6,882,784.

Suitable optical fiber components include slotted cores, reinforcing elements, filler rods, spacers, connectors, clips, ribbons, inserts, the like and mixtures thereof. Optical fiber cables can also be housed with a mixture of other cables, such as e.g. coaxial cable, insulated conductors, power carrying cables, the like and mixtures thereof.

Suitably the thickness of the coating, insulation, jacket, buffer tube, sheath or conduit etc. is within the range of about 0.5 mil to about 500 mil. The insulation, coating or buffer tubes or components can be prepared from one or more coatings.

Coated wire or cable of the present invention can be used for many applications with the addition of the appropriate additive or filler. In the automotive industry, for example, the wire and cable coatings typically contain flame-retardant additives. Suitable applications include copper telephone cables or wires; transmission of data, voice, or video; RF transmission, high frequency antenna wire, computer cables, power cables, under-the-hood automotive wire, appliance wire, LAN cables and premise wire, and the like.

The following examples merely illustrate the invention. Those skilled in the art will recognize many variations that are within the spirit of the invention and scope of the claims.

EXAMPLE 1

Cable Coating Made from HDPE and Phenolic Polymeric Antioxidant

A high density polyethylene (HDPE) (99 parts by weight, PETROTHENE® L5005, Equistar Chemicals) and a phenolic polymeric antioxidant (1 part by weight, Polnox P6-07, University of Massachusetts, Lowell) are mixed in a Brabender mixer at 170° C. to form a concentrate. The concentrate is let down by the HDPE in an 18" Leistritz twin screw extruder at 230° C. and 290 rpm to three concentrations: 500, 1,000, and 1,500 ppm. The diluted samples are each pressed into films of 75 mil thickness by compression molding at 370° C. and then cooled in water at 20° C. for 5 minutes and air for 3 minutes.

Each film is cut to four samples of the same size by a circular die with a diameter of about 0.5 inch; each sample weighs about 7 mg to about 7.5 mg. The twelve samples are divided into two lots; each lot has two samples of the three concentrations: 500 ppm, 1,000 ppm and 1,500 ppm. The first lot of six samples is not aged (un-aged) before testing for the oxidative induction time (OIT). The first lot is not aged before testing for the OIT values of the two samples having the same antioxidant concentration. The average OIT is calculated from the two samples having the same antioxidant concentration. The second lot of six samples is aged at 70° C. for 7 days while submersed in a water-blocking agent (WITCO II LV 0.2, Chemtura Corp.) before measuring the oxidative induction time (OIT).

The OIT of the samples is determined according to the procedure of ASTM D 3895. The system used to measure the OIT is TA Instruments Model 911001.902 connected to a computer running Thermal Advantage (TA) Universal Analysis 2000 (Windows 2000). The system is first calibrated with indium and tin before loading the sample and the reference pan into the cell. The sample and the reference are heated at a constant rate in an inert nitrogen environment. When the temperature reaches 200° C., the specimen is kept at 200° C. for a period of 5 minutes before changing the gas flow to oxygen. The zero point of the induction period is the point at which the nitrogen flow is switched to oxygen. The end of the induction period is signaled by an abrupt increase in the sample's evolved heat or temperature as recorded by the DSC.

The average OIT values of the un-aged samples are 24, 34, and 49 minutes for the films containing 500, 1,000, and 1,500 ppm of the phenolic polymeric antioxidant, respectively. The average OIT values of the aged samples are 20, 27, and 43 minutes for the films containing 500, 1,000, and 1,500 ppm of the phenolic polymeric antioxidant, respectively. The results are listed in Table 1.

COMPARATIVE EXAMPLE 2

Cable Coating Made from HDPE and Traditional Non-Polymeric Antioxidant

The general procedure of Example 1 is repeated except the phenolic polymeric antioxidant Polnox P6-07 is replaced with a traditional antioxidant, IRGANOX® 1076 (product of Ciba-Geigy). The average OIT values of the un-aged samples are 8, 11, and 17 minutes for the films containing 500, 1,000, and 1,500 ppm of antioxidant, respectively. The average OIT values of the aged samples are 3, 4, and 6 minutes for the films containing 500, 1,000, and 1,500 ppm of antioxidant, respectively.

EXAMPLE 3

Cable Coating Made from LLDPE and Phenolic Polymeric Antioxidant

The general procedure of Example 1 is repeated except the HDPE is replaced with a linear low density polyethylene (LLDPE) (99 parts by weight, PETROTHENE® GA808, Equistar Chemicals), and the concentrate is let down with the LLDPE to two concentrations: 1,000 and 2,000 ppm. The average OIT values of the un-aged samples are 37 and 59 minutes for the films containing 1,000 and 2,000 ppm of antioxidant, respectively. The average OIT values of the aged samples are 21 and 48 minutes for the films containing 1,000 and 2,000 ppm of antioxidant, respectively.

COMPARATIVE EXAMPLE 4

Cable Coating Made from LLDPE and Traditional Non-Polymeric Antioxidant

The general procedure of Example 3 is repeated except the phenolic polymeric antioxidant Polnox P6-07 is replaced with a traditional antioxidant IRGANOX® 1010. The average OIT values of un-aged samples are 26 and 41 minutes for the films containing 1,000 and 2,000 ppm of antioxidant, respectively. The average OIT values for the aged samples are 8 and 9 minutes for the films containing 1,000 and 2,000 ppm of antioxidant, respectively.

EXAMPLE 5

Cable Coating Made from HDPE and Phenolic Polymeric Antioxidant

The general procedure of Example 2 is repeated except HDPE PETROTHENE® L5005 is replaced with HDPE PETROTHENE® GA808 (product of Equistar Chemicals). The concentrate is let down by GA808 to two concentrations: 1,000 and 2,000 ppm. The average OIT values of the un-aged samples are 26 and 41 for the films containing 1,000 and 2,000 ppm of antioxidant, respectively. The average OIT values of the aged samples are 18 and 33 minutes for the films containing 1,000 and 2,000 ppm of antioxidant, respectively.

COMPARATIVE EXAMPLE 6

Cable Coating Made from HDPE and Traditional Non-Polymeric Antioxidant

The general procedure of Example 5 is repeated except the phenolic polymeric antioxidant Polnox P6-07 is replaced with a traditional antioxidant, IRGANOX® 1010. The average OIT values of the un-aged samples are 10 and 32 minutes for the films containing 1,000 and 2,000 ppm of antioxidant, respectively. The average OIT values of the aged samples are 8 and 20 minutes for the films containing 1,000 and 2,000 ppm of antioxidant, respectively.

The OIT test results of the above examples are summarized in Table 1. The results indicate that wire and cable coatings, buffer tubes and components prepared with the polyolefin and polymeric antioxidant of the invention are significantly more stable than the traditional ones. This is particularly so when the polyolefin is aged under the test condition which the wires and cables are required to undergo.

TABLE 1

Summary of OIT Test Results

| Ex. No. | Polyolefin | Antioxidant Type | Amount ppm | OIT, min Un-aged Sample | OIT, min Aged Sample |
|---|---|---|---|---|---|
| Ex. 1 | HDPE | Polnox P6-07 | 500 | 24 | 20 |
|  |  |  | 1000 | 34 | 27 |
|  |  |  | 1500 | 49 | 43 |
| C. Ex. 2 | HDPE | IRGANOX 1076 | 500 | 8 | 3 |
|  |  |  | 1000 | 11 | 4 |
|  |  |  | 1500 | 17 | 6 |
| Ex. 3 | LLDPE | Polnox P6-07 | 1000 | 37 | 21 |
|  |  |  | 2000 | 59 | 48 |
| C. Ex. 4 | LLDPE | IRGANOX 1010 | 1000 | 26 | 8 |
|  |  |  | 2000 | 41 | 9 |
| Ex. 5 | HDPE | Polnox P6-07 | 1000 | 26 | 18 |
|  |  |  | 2000 | 41 | 33 |
| C. Ex. 6 | HDPE | IRGANOX 1010 | 1000 | 10 | 8 |
|  |  |  | 2000 | 32 | 20 |

We claim:
1. A wire or a cable comprising:
(a) a conductor or an optical fiber, and
(b) a coating that covers at least a portion of the conductor or the optical fiber, said coating comprising from about 45 wt % to about 99.9 wt % of a polyolefin and wherein the coating contains from about 0.005 wt % to about 5 wt % of antioxidants, and said antioxidants consisting of one or more phenolic polymeric antioxidants having a molecular weight of from 1,000 to 2,000,000 and a recurring unit selected from the group consisting of (I), (II), and mixtures thereof:

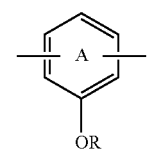

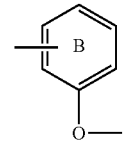

wherein R is selected from the group consisting of hydrogen, alkyl, acyl, and aryl; ring A and ring B are each independently substituted with at least one tert-butyl group or n-alkoxycarbonyl group; and ring A and ring B are each independently substituted with at least one substituent selected from the group consisting of hydroxyl, amino, thiol, alkyl, aryl and alkoxycarbonyl groups,
wherein the wire or cable contains a water-blocking agent; and wherein the coating, after thermal aging in a water-blocking agent at 70° C. for at least 7 days, has an OIT within the range of about 18 minutes to about 48 minutes.
2. The wire or cable of claim 1 wherein the coating contains from about 70 wt % to about 95 wt % of the polyolefin.

3. The wire or cable of claim 1 wherein the coating contains from about 0.01 wt % to about 0.1 wt % of the phenolic polymeric antioxidant.

4. The wire or cable of claim 1 wherein the polyolefin is selected from the group consisting of polyethylene, polypropylene, and mixtures thereof.

5. The wire or cable of claim 1 wherein the density of the polyolefin is within the range of about 0.89 g/cm$^3$ to about 0.97 g/cm$^3$.

6. The wire or cable of claim 5 wherein the polyolefin is a high density polyethylene.

7. The wire or cable of claim 1 wherein the coating further comprises an additive selected from the group consisting of foaming agents, cross-linking agents, nucleation agents, flame retardants, light stabilizers, processing aids, heat stabilizers, antistatic agents, lubricants, optical brighteners, pigments, antioxidants, dispersants, and mixtures thereof.

8. The wire or cable of claim 1 wherein the coating further comprises a filler selected from the group consisting of carbon black, talc, mica, clay, kaolin, silica, diatomaceous earth, fly ash, calcium carbonate, magnesium carbonate, barium carbonate, magnesium sulfate, barium sulfate, calcium sulfate, calcium oxide, magnesium oxide, titanium dioxide, aluminum oxide, aluminum hydroxide, glass powder, wood or other cellulose-type powders, zeolites, cement dust, and mixtures thereof.

9. The wire or cable of claim 1 wherein the water-blocking agent is selected from the group consisting of grease, petroleum, elastomers, and mixtures thereof.

10. The wire or cable of claim 1 wherein the wire or cable is a telephone single, a twisted pair, a coaxial cable, a power cable or an optical fiber cable.

11. The wire or cable of claim 1 wherein the coating comprises two or more layers with at least one layer composed of the polyolefin and the phenolic polymeric antioxidant.

12. The wire or cable of claim 11 wherein the coating comprises at least one nonfoam layer and at least one foamed layer.

13. The wire or cable of claim 1 wherein the coating has a thickness within the range of about 0.5 mil to about 500 mil.

14. The wire or cable of claim 1 wherein the phenolic polymeric antioxidants have a molecular weight of from 2,000 to 100,000.

15. An optical fiber cable comprising
(a) one or more optical fibers, and
(b) a buffer tube disposed around the optical fiber, said buffer tube comprising from about 45 wt % to about 99.9 wt % of a polyolefin and from about 0.005 wt % to about 5 wt % of a phenolic polymeric antioxidant having a molecular weight of from 1,000 to 2,000,000 and a recurring unit selected from the group consisting of (I), (II), and mixtures thereof:

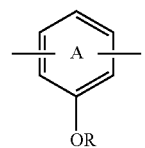

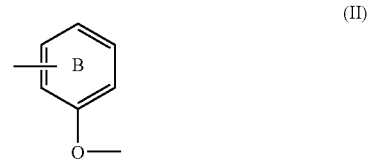

wherein R is selected from the group consisting of hydrogen, alkyl, acyl, and aryl; ring A and ring B are each independently substituted with at least one tert-butyl group or n-alkoxycarbonyl group; and ring A and ring B are each independently substituted with at least one substituent selected from the group consisting of hydroxyl, amino, thiol, alkyl, aryl and alkoxycarbonyl groups,
  wherein the wire or cable contains a water-blocking agent;
  and wherein the coating, after thermal aging in a water-blocking agent at 70° C. for at least 7 days, has an OIT within the range of about 18 minutes to about 48 minutes.

16. The optical fiber cable of claim 15 wherein the buffer tube is a monotube, a loose tube, or a slotted core.

17. The optical fiber cable of claim 15 comprising a component selected from the group consisting of slotted cores, filler rods, reinforcing elements, spacers, connectors, and mixtures thereof.

18. The optical fiber cable of claim 17 wherein the component comprises from about 45 wt % to about 99.9 wt % of a polyolefin and from about 0.005 wt % to about 5 wt % of the phenolic polymeric antioxidant.

19. The wire or cable of claim 15 wherein the phenolic polymeric antioxidants have a molecular weight of from 2,000 to 100,000.

* * * * *